United States Patent [19]

New

[11] Patent Number: 5,693,994
[45] Date of Patent: Dec. 2, 1997

[54] BACK-UP BEARING ARRANGEMENT FOR A MAGNETIC BEARING

[75] Inventor: Nigel H. New, Harrow, England

[73] Assignee: The Glacier Metal Company Limited, England

[21] Appl. No.: 765,065

[22] PCT Filed: Jun. 28, 1995

[86] PCT No.: PCT/GB95/01521

§ 371 Date: Jan. 6, 1997

§ 102(e) Date: Jan. 6, 1997

[87] PCT Pub. No.: WO96/01956

PCT Pub. Date: Jan. 25, 1996

[30] Foreign Application Priority Data

Jul. 7, 1994 [GB] United Kingdom ............. 9413669

[51] Int. Cl.⁶ ............................................ H02K 5/16
[52] U.S. Cl. .................. 310/90.5; 310/90; 310/64; 310/74; 29/898.06; 384/913; 384/907.1; 384/278
[58] Field of Search ............... 310/90, 74, 90.5, 310/64; 508/100; 29/898.06, 898.15, 898.14; 148/400; 252/12; 384/907.1, 913, 278

[56] References Cited

U.S. PATENT DOCUMENTS

| 5,083,053 | 1/1992 | New ............................ 310/90.5 |
| 5,135,314 | 8/1992 | Momose et al. .............. 384/275 |
| 5,352,046 | 10/1994 | Ward ........................... 384/492 |
| 5,575,571 | 11/1996 | Takebayashi et al. ..... 384/492 |
| 5,588,754 | 12/1996 | Miller .......................... 384/609 |
| 5,593,234 | 1/1997 | Liston .......................... 384/492 |
| 5,599,109 | 2/1997 | Negwer ....................... 384/308 |

FOREIGN PATENT DOCUMENTS

| 0 262 939 | 4/1988 | European Pat. Off. . |
| 0 296 291 | 12/1988 | European Pat. Off. . |
| 0 411 695 A2 | 6/1991 | European Pat. Off. . |
| 0 598 421 A1 | 5/1994 | European Pat. Off. . |
| 3510608 A1 | 10/1986 | Germany . |
| 1 495 736 | 12/1977 | United Kingdom . |
| 2 234 560 | 2/1991 | United Kingdom . |

OTHER PUBLICATIONS

Patent Abstracts of Japan; vol. 10, No. 301 (M–525) (2357) 14 Oct. 1986.

Primary Examiner—Steven L. Stephan
Assistant Examiner—Timothy A. Williams
Attorney, Agent, or Firm—Nixon & Vanderhye

[57] ABSTRACT

A back-up bearing arrangement (25) for a magnetic bearing (12, 13) includes a stationary dry running bearing material (30) and a rotable collar (26) which runs in abutment where with upon failure of the magnetic bearing. To avoid adhesive wear due to localised welding or melting of bearing material at surface asperities because of the inability of collar material (chosen to withstand centrifugal stresses at high rotation rates) to remove it adequately, the contact-making face of the collar is plated with a layer of copper on which is deposited a thin layer of titanium nitride.

15 Claims, 1 Drawing Sheet

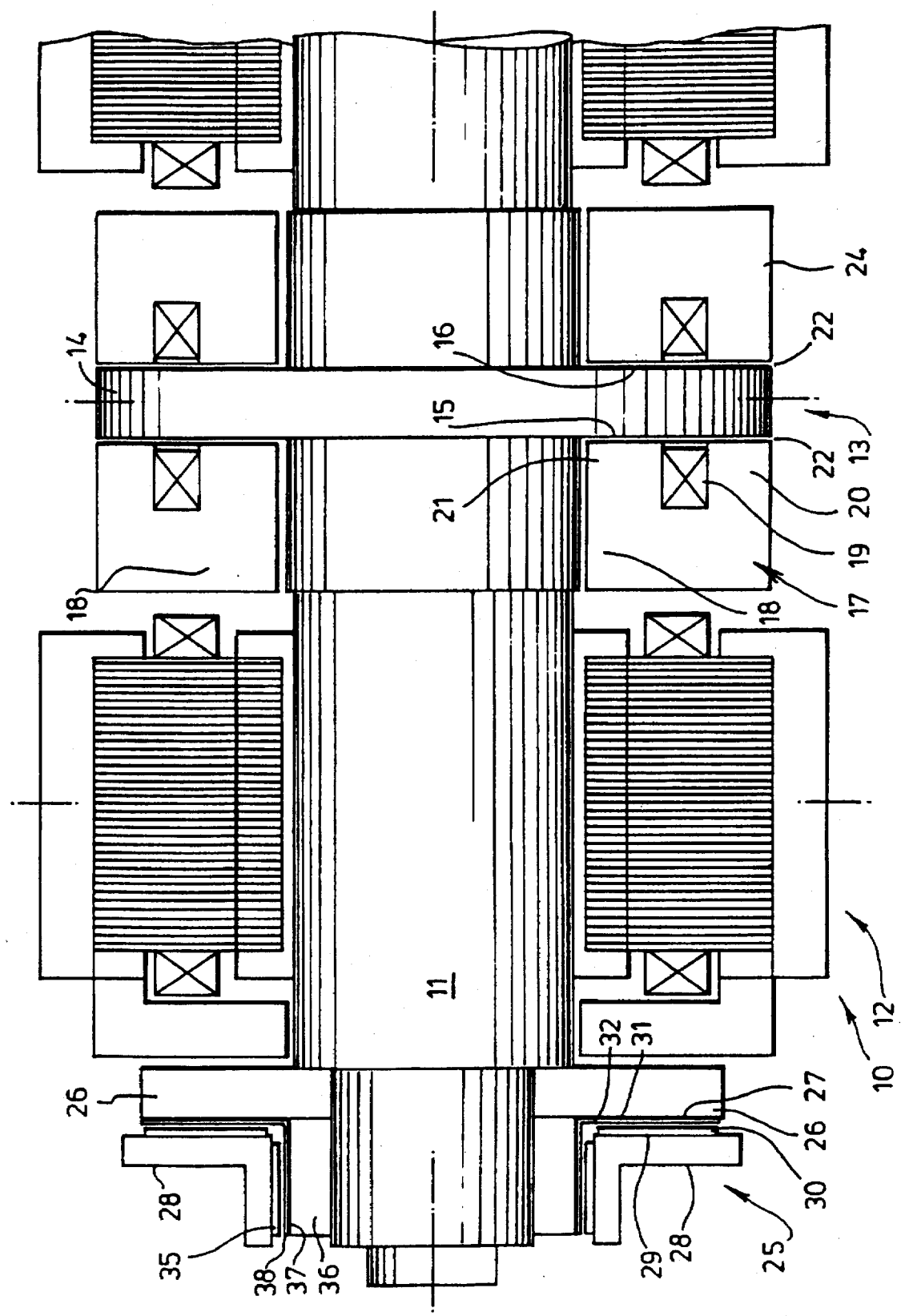

BACK-UP BEARING ARRANGEMENT FOR A MAGNETIC BEARING

This invention relates to back-up bearing arrangements for magnetic bearings.

It is known to provide bearing functions for a rotating body by suspending the body, in particular a rotor thereof, in a magnetic field derived from one or more permanent magnet and/or electro-magnet.

Magnetic bearings also are employed to provide both radial support for a shaft or body and axial support, that is, as thrust bearings.

In general the radial and axial support is combined with closed loop position control wherein the axial position or deviation from a chosen position is monitored and employed to vary the current flowing in a suspension electro-magnet and restore the body to a desired position.

It is well known that magnetic bearings are employed where the rotational speed is very high, often in the region of 25–30,000 rpm, notwithstanding that the body may be heavy and rotate about a shaft of tens of centimeters diameters.

It is a feature of practical magnetic bearings that the electromagnetic control is able to function properly within a limited range displacements and/or frequency of displacements, partly due to the small air gaps employed between rotating and stationary components and the high stiffness that accommodates controlled electromagnetic suspension.

Thus there exists always the possibility of the rotor being subjected to extraneous external forces of such magnitude and/or frequency that exceed the restoring capabilities of the electromagnetic control, as well as the possibility of failure of electromagnetic forces per se, that would inevitably result in the contacting of the rotor and stationary components and damage to either or both.

Electromagnetic bearings therefore generally employ back-up bearing arrangements which are intended to run in contact for a limited continuous period, usually sufficient only until the body can be brought to rest. Frequently therefore, they have a significant degree of friction to effect braking of the body which is no longer successfully suspended magnetically. Such back-up bearings are known and applicable to both radial and axial bearings.

Typically such a back-up bearing arrangement includes a collar carried by, or formed integrally with, a rotatable shaft and other parts of the magnetic bearing that is both load bearing and thermally conductive and has one or more surface regions which are disposed with respect to a stationary bearing part so that in operation the regions run in abutment with the stationary part. To effect a bearing function at all, the stationary part comprises a dry running bearing material having a sponge-like matrix of bronze or iron loaded with a dry lubricant such as graphite, molybdenum disulphide or tungsten disulphide.

Notwithstanding the lubricated nature of the stationary material, heat is generated by the abutment and requires to be conducted away through the collar to prevent accelerated wear of the dry bearing material due to the phenomenon of adhesive wear caused by local asperities of the collar and matrix of the bearing material welding together.

Furthermore, a degree of friction, which inevitably generates heat, is desirable in producing a braking effect on the rotating parts of the bearing to bring them to rest, so reducing the effective coeficient of friction of the dry running bearing material and/or the collar is not a solution.

However, in magnetic bearings, the high speed of rotation places emphasis on the strength of the collar material to withstand centrifugal loading. In this respect it is usual to have the collar formed from steel, notwithstanding that the conduction of heat from the abutting surfaces of the bearing arrangement is below optimum and the metals of the collar and bearing material readily melt locally to exacerbate wear.

It will be appreciated that such wear is also a function of linear speed between the surfaces, and this increases as a function of radius of a rotating body. Therefore, in the case of an axial or thrust bearing which is mounted with respect to a relatively large diameter shaft, the radially extending, axially facing, surface of the rotating collar comprising the thrust bearing has a considerable linear speed with respect to the stationary part of the bearing.

It is known in machine tool cutter design to prolong the life of cutting tools where a steel tip runs in contact with it, by providing the collar surface with a thin coating of a hard wearing ceramic material, titanium nitride being particularly effective, which is found to reduce the adhesive wear of the tools.

Such technique has not been found totally satisfactory when applied to back-up bearing arrangements for magnetic bearings as described above, and particularly the thrust bearings wherein there is a high linear speed between collar and dry bearing material because of its distance from the axis of rotation, for although the use of titanium nitride, for example, has been found to reduce adhesive wear by the order of 50%, the remaining wear is still of such a magnitude as to be unsatisfactory in high speed magnetic bearings.

It is an object of the present invention to provide a back-up bearing for a high-speed magnetic bearing arrangement with improved adhesive wear properties and a method of producing such back-up bearing.

According to a first aspect of the present invention a back-up bearing arrangement for a high speed magnetic bearing comprises a stationary dry running bearing material, comprising a metallic matrix loaded with a dry lubricant, and a rotatable load bearing, thermally conductive collar having at least one surface region arranged, in operation of the arrangement, to run in abutment with the dry running bearing material, each said surface region of the collar being coated with a layer of metal having a higher thermal conductivity than the collar material and a thin layer of hard wearing ceramic material being deposited on said layer of metal.

The collar may, for strength, be selected from the group steel, titanium, silicon nitride and silicon carbide.

Preferably the metal having a higher conductivity is copper. The copper may be formed as a plate, conveniently by electroplating, in the range 0.2 mm–0.5 mm thickness and machined to a smooth surface before disposition of the ceramic material.

Preferably the hard wearing ceramic material is titanium nitride.

The ceramic coating may be in the range 2 μm to 10 μm thickness, and preferably in the range 2 μm to 5 μm, and applied by vapour phase deposition.

According to a second aspect of the present invention a method of producing a contact-making back-up bearing arrangement for a high speed magnetic bearing in which a load bearing, thermally conductive collar has at least one surface region which, in operation of the back-up bearing arrangement, is arranged to run in abutment with a stationary dry running bearing material, comprises forming the dry running bearing material from a metallic matrix loaded with a dry lubricant, depositing on each said surface region of the collar a layer of metal having a higher thermal conductivity than the collar, and depositing on the layer of said metal a thin layer of hard wearing ceramic material.

The layer of metal may be deposited by electroplating and machined to provide a smooth surface for the ceramic material, possibly by diamond turning.

The layer of ceramic material may be deposited by the vapour phase deposition onto the electroplated, and if appropriate machined, layer.

An embodiment of the present invention will be described by way of example with reference to the accompanying drawings in which the single FIGURE is a schematic cross-sectional elevation through a machine having a shaft and electromagnet supporting bearings offering radial and axial support for the shaft in rotation at high speed and a back-up bearing arrangement in accordance with the present invention.

Referring to the FIGURE, a high speed machine 10 includes a shaft 11 which is supported in relation to stationary parts thereof by at least a radial, or journal, magnetic bearing 12 and at least one axial, or thrust, magnetic bearing 13.

Considering the axial magnetic bearing 13, this comprises a rotor 14 of ferromagnetic material, conveniently steel, machined as part of the shaft 11, the rotor providing radially extending, oppositely axially-facing faces 15 and 16.

Disposed adjacent at least face 15 is a magnetic bearing stator 17 which comprises an annular core 18 extending about the shaft and including an annular electromagnet coil 19.

The core provides pole faces 20, 21 disposed in close proximity to the face 16 of the rotor, separated by an air gap 22, and combines with the air gap and core to form a magnetic circuit which effects an axially directly pull on the rotor. Such pull in a single direction may balance and moderate external axial thrust on the shaft, but more usually a corresponding stator 24 is disposed adjacent rotor face 16 and exerts an oppositely directed axial pull. Control circuits, not shown, respond to displacement of the stator from an axial position intermediate the stators to vary current flowing in the electromagnet coils thereof to restore its position.

To accommodate failure or overwhelming of the electro magnets a beck-up bearing arrangement 25 is provided. This arrangement includes a radially extending steel collar 26 mounted on the shaft 11 towards one end thereof, which collar has a radially extending axial face 27. A stationary support 28, fixed with respect to the stator of the magnetic bearing, has, spaced from the collar, a radially extending face 29 whose surface is formed of a dry running bearing material 30, such as the type sold under the name DEVA (RTM) which comprises a bronze matrix loaded with a dry lubricant. The bearing functions when external axial forces overwhelm the axial pull of electromagnet 24 and the rotor 14 moves towards stator 17. Before such damaging contact can occur the collar face 27 abuts and runs in contact with the surface of the bearing material 30 both supporting the shaft (to prevent contact between the body 14 and stator 17 of the magnetic bearing) and dissipating rotational energy by friction between the surfaces.

As thus far described the axial bearing with its back-up bearing arrangement is conventional and it has been found that contact between the steel collar surface and bearing material can result in accelerated wear of the latter due to so-called adhesive wear as localised welding between asperities of the steel collar and bronze of the bearing material.

The problem has been found particularly bad, and not easily overcome, for high speed large diameter shafts. For example, in one application the shaft 11 has a diameter of some 11.5 cms (4.5 inches) requiring a collar having an overall diameter of some 18 cms (7 inches). The shaft is required to rotate in excess of 25,000 rpm so that the linear speed of the radially outer parts of the face 27 with respect to the dry bearing material 20 is in excess of $34 \times 10^6$ cms/minute or $5.67'10^3$ meters/sec.

It has been found that by coating the steel collar surface with a thin layer of hard ceramic material, such as titanium nitride as done with machine tool cutters which operate at lower speeds, the steel surface of the collar is kept from direct contact with the metal matrix of the bearing material and adhesive wear is reduced by the order of 50% over that experienced with a bare steel surface alone. However, the degree of adhesive wear due to the high rotation speeds is still unacceptable.

In accordance with the present invention face 27 which is able to run in contact with the dry bearing material 30 is provided with a layer 31 of copper and the layer of copper is in turn provided with a thin coating 32 of titanium nitride.

The copper layer, due to its high thermal conductivity, extracts and distributes heat from concentrated sources at spaced asperities to the extent that the heat is distributed over a greater area of the face of the steel collar body which is able to conduct the heat away and reduces the temperature of the asperity contact.

It has been found that in such circumstances as exemplified above, by preventing the sustaining of such local hot spots the adhesive wear can be reduced significantly over the use of a thin layer of titanium nitride deposited directly onto the steel collar, as described in the following Example.

A steel collar of 11.5 cm diameter for mounting on a shaft for rotation in excess of 25,000 rpm, had copper deposited onto the radially extending faces by electroplating to a thickness of between 0.2 and 0.5 mm. The copper layer was then machined flat by diamond turning to a smoothness of the order of 0.4 µm cla (8 microinch cla).

The copper plated collar was then subjected to a conventional vapour phase deposition process in which, at a temperature of between 300° C. and 400° C. and in a nitrogen atmosphere, titanium was vaporised by an electron beam and reacted with the nitrogen to form titanium nitride deposited as a layer on each machined copper surface to a thickness of between 2–µm.

When tested it was found that adhesive wear decreased by about 50% over the use of a thin layer of titanium nitride alone without the copper layer.

The titanium nitride may be deposited in a thicker layer than on the above example and thicknesses in the range 2–10 µm have been found satisfactory with copper on steel.

Although vapour deposition has been found to give the most uniform coating of the titanium nitride it will be appreciated that other techniques, such as electrical furnace vaporisation my be used.

Likewise alternatives to electroplating may be employed to provide the copper layer, as long as the interface with the steel collar provides an adequate rate of heat transfer and the bond to the steel is of sufficiently high strength.

Although the above-described embodiment has copper as the metal having a suitably high thermal conductivity, it will be appreciated that other metals may be employed which have a sufficiently high thermal conductivity and which are amenable to deposition onto the steel surface or permit of some other form of thermally conductive attachment.

Also the titanium nitride may be replaced by an alternative hard wearing ceramic material which can be formed in a relatively thin, uniform layer from which heat due to local asperities is readily conducted away from the regions where adhesive wear could occur and into the collar.

Although described in detail and shown in an arrangement which responds to axial forces in one direction to protect the stator 17, it will be seen that to protect the stator 24, the other radially extending face of collar 26 may be likewise provided with a highly conductive metal layer and thin layer of hard wearing ceramic and a further stationary body (not shown) causes a layer of dry running bearing material to be disposed adjacent to it in the manner of 26. Furthermore, although described in detail with respect to a back-up arrangement for an axial bearing 13, which presents particular problems because of the high linear speeds at the outer radius of the collar 26, the invention is equally applicable to contact making back-up bearings associated with the radial bearing 12.

As illustrated in the back-up bearing arrangement 25 the support 28 also includes a cylindrical surface 35 formed of said dry running bearing material and the shaft 11 is provided also with a cylindrical steel collar 36 on the surface of which a layer 37 and 38 of copper and titanium nitride respectively as aforesaid are deposited.

It will be appreciated that whereas the steel collars forming the base of the rotatable surfaces of the back-up bearing arrangement are shown as discrete bodies carried by shaft 11 they may be formed integrally with a shaft of the same material and if not constrained by the arrangements of disposing the magnetic bearing parts with respect to the shaft.

The collar 29 (or 36) may be of a material other than steel which has the ability to withstand the loading not only between the contacting surfaces but also the centrifugal loading due to rotation of the shaft at high speed. Thus either or both collars may be formed not only of steel but of other engineering materials having suitable properties of strength, density and thermal conductivity. Titanium may be employed as a metal where the rotating mass is required to be as low as possible whereas non metals, such as engineering ceramics silicon carbide and silicon nitride, may be employed instead.

I claim:

1. A back-up bearing arrangement for a high speed magnetic bearing comprising a stationary dry running bearing material, comprising a metallic matrix loaded with a dry lubricant, and a rotatable load bearing, thermally conductive collar having at least one surface region arranged, in operation of the arrangement, to run in abutment with the dry running bearing material, each said surface region of the collar being coated with a layer of metal having a higher thermal conductivity than the collar material and a thin layer of hard wearing ceramic material deposited on said layer of metal.

2. An arrangement as claimed in claim 1 in which the collar is formed principally of a material selected from one of the group steel, titanium, silicon nitride and silicon carbide.

3. An arrangement as claimed in claim 1 in which the layer metal having a higher thermal conductivity is copper.

4. An arrangement as claimed in claim 1 in which the layer metal has a thickness between 0.2 and 0.8 mm.

5. An arrangement as claimed in claim 1 in which the layer of metal is an electro-plated layer.

6. An arrangement as claimed in claim 1 in which the layer of metal has a surface smoothness of 0.4 μm cla or better.

7. An arrangement as claimed in claim 1 in which the ceramic material of said thin layer is titanium nitride.

8. An arrangement as claimed in claim 1 in which the ceramic material is deposited to a layer thickness in the range 2 to 10 μm.

9. An arrangement as claimed in claim 8 in which the layer thickness is the range 2 to f μm.

10. A method of producing a contact-making back-up bearing arrangement for a high speed magnetic bearing in which a load bearing, thermally conductive collar has at least one surface region which, in operation of the back-up bearing arrangement, is arranged to run in abutment with a stationary dry running bearing material, comprising forming the dry running bearing material from a metallic matrix loaded with a dry lubricant and depositing on each said surface region of the collar a layer of metal having a higher thermal conductivity than the collar, and depositing on the layer of said metal a thin layer of hard wearing ceramic material.

11. A method as claimed in claim 10 comprising forming the collar principally from a material of the group steel, titanium, silicon nitride and silicon carbide.

12. A method as claimed in claim 10 comprising electro-depositing as said metal a layer of copper to a thickness in the range 0.2 to 0.5 mm and machining the surface to a smoothness of 0.4 μm or better.

13. A method as claimed in claim 10 comprising depositing a thin layer of titanium nitride as the ceramic material.

14. A method as claimed in claim 10 comprising depositing said thin layer of ceramic material by vapour phase deposition.

15. A method as claimed in claim 10 comprising depositing the ceramic material to a layer of thickness in the range 2 to 10 μm.

* * * * *